Nov. 20, 1923.　　　　J. ZDZIEBLO　　　　1,474,922
FEED BAG FOR HORSES
Filed March 15, 1923
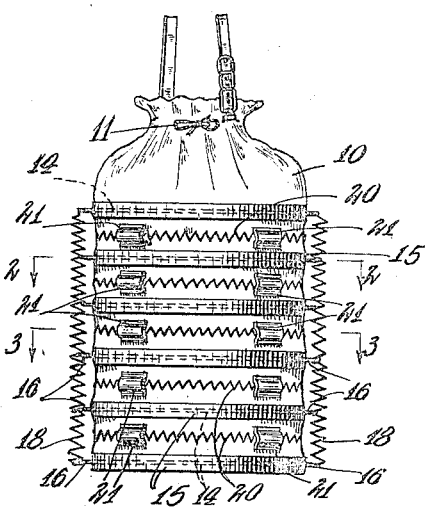
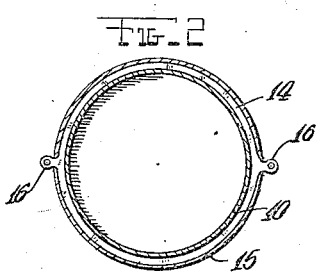　　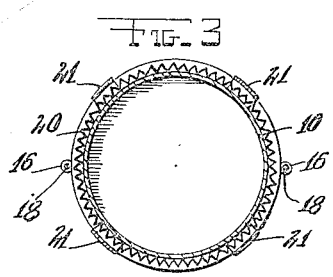
Inventor
John Zdzieblo
Attorney Patented Nov. 20, 1923.

1,474,922

UNITED STATES PATENT OFFICE.

JOHN ZDZIEBLO, OF IRVINGTON, NEW JERSEY.

FEED BAG FOR HORSES.

Application filed March 15, 1923. Serial No. 625,317.

*To all whom it may concern:*

Be it known that I, JOHN ZDZIEBLO, a citizen of Poland, residing at Irvington, in the county of Essex and State of New Jersey, have invented certain new and useful Improvements in Feed Bags for Horses, of which the following is a specification.

This invention relates to feed bags for horses, sometimes called horses' nose-bags, and which are suspended from the head of the animal with the mouth of the latter projecting into the bag.

With bags of this type as ordinarily constructed the horse cannot reach the feed, when the bag has been partially emptied, without reaching down and resting the bag on the ground, resulting both in a tendency of the bag to slip off the head of the horse and also rendering the bag liable to injury.

The present invention has for an object to provide a bag in which the mouth of the animal will always be in contact with the feed in the bag, thereby avoiding the above noted objections.

For further comprehension of the invention, and of the objects and advantages thereof, reference will be had to the following description and accompanying drawings, and to the appended claims in which the various novel features of the invention are more particularly set forth.

Fig. 1 of the drawings is a side view of a horses' feed bag constructed according to my invention.

Fig. 2 is a horizontal section taken on the line 2—2 of Fig. 1.

Fig. 3 is a horizontal section taken on the line 3—3 of Fig. 1.

As here embodied my improved feed bag comprises a main body or bag proper 10 which may be made as usual of canvas and is of the proper size and shape. The top of this bag may be provided with a pair of drawstrings 11 whereby it is closed, these drawstrings being passed through retaining elements in the usual manner.

Surrounding the bag, at vertically spaced intervals, are a series of metal rings 14 which may be covered by canvas strips 15 stitched to the body 10 of the bag. These rings are each formed with a number, as here shown two, of eyes 16 spaced evenly therearound and projecting through suitable apertures in the strips 15, the eyes on the various rings being vertically alined with each other. To these eyes are attached tension springs 18 which act, as will be apparent to draw the various rings toward one another and thus shorten the bag.

Surrounding the bag, between the rings 14, are tension springs 20 arranged in the form of annuli and which act to contract the bag at points between the rings 14. These springs may be held in place each by means of a suitable number of short straps 21 stitched at opposite edges to the main bag body 10.

These annular springs 20, as will be apparent, act to cause a substantially even crimping of the bag all around the same as the latter is shortened by the springs 18, having also a slight shortening action on the bag although dependence is placed mainly on the springs for this purpose.

In the use of the bag, when the same is suspended in the usual manner (with the feed therein) from the head of the horse, the bag will be extended by reason of the weight of the feed to approximately its full length, the mouth of the horse being then in contact with the top of the feed. As the feed is consumed and the pull on the springs 18 lessens in consequence, these springs will contract and keep the feed in contact with the mouth of the animal until entirely consumed.

While I have illustrated and described a preferred embodiment of my invention it will be understood that I do not limit myself to the precise construction herein disclosed and that various changes and modifications might be made therein without departing from the spirit and scope of the invention as defined in the appended claims.

Having thus described my invention what I claim as new and desire to protect by Letters Patent of the United States is as follows:

1. A feed bag for horses comprising a main body, a series of vertically spaced rigid rings secured to said body, and resilient elements acting to draw said rings toward one another, said resilient elements comprising tension springs connected to the said rings.

2. A feed bag for horses comprising a main body, a series of rings vertically spaced along said body, fabric covering strips for said rings, eyes on said rings projecting through said fabric strips, and tension springs connected to said eyes.

3. A feed bag for horses comprising a main body, a series of vertically spaced rigid rings secured to said body, and resilient elements acting to draw said rings toward one another, and other resilient elements surrounding said body between said rings and acting to contract the body circumferentially.

4. A feed bag for horses comprising a main body, a series of rings vertically spaced along said body, fabric covering strips for said rings, eyes on said rings projecting through said fabric strips, and tension springs connected to said eyes, and spring annuli surrounding the said body between the said rings, for the purpose set forth.

In testimony whereof I have affixed my signature.

JOHN ZDZIEBLO.